United States Patent [19]
Wong

[11] Patent Number: 5,745,393
[45] Date of Patent: Apr. 28, 1998

[54] LEFT-SHIFTING AN INTEGER OPERAND AND PROVIDING A CLAMPED INTEGER RESULT

[75] Inventor: Roney S. Wong, Sunnyvale, Calif.

[73] Assignee: Samsung Electronics Company, Ltd., Rep. of Korea

[21] Appl. No.: 731,655

[22] Filed: Oct. 17, 1996

[51] Int. Cl.[6] ............................................. G06F 7/00
[52] U.S. Cl. ............................................. 364/715.08
[58] Field of Search ........................ 364/715.08

[56] References Cited

U.S. PATENT DOCUMENTS

| | | | |
|---|---|---|---|
| 4,931,970 | 6/1990 | Cook et al. | 364/715.08 |
| 5,282,153 | 1/1994 | Bartkowiak et al. | 364/715.08 |
| 5,555,202 | 9/1996 | Chu | 364/715.08 |

OTHER PUBLICATIONS

"Programming The 80386" by Crawford et al., published by SYBEX Inc., 1987, pp. 241–244 and 405–406.

"Computer Arithmetic Systems: Algorithms, Architecture and Implementations" by A. Omondi, published by Prentice Hall International (UK) Limited, 1994, pp. 505–513.

Primary Examiner—Tan V. Mai
Attorney, Agent, or Firm—Skjerven, Morrill, MacPherson, Franklin & Friel, LLP; David M. Sigmond

[57] ABSTRACT

A method and apparatus for left-shifting a signed or unsigned integer operand and providing a clamped integer result in a single instruction cycle is disclosed. The apparatus includes a left-shifter for left-shifting the operand to obtain a shifted intermediate result and shifted-out bits. The apparatus also includes an overflow detector for generating an overflow signal in response to a sign bit of the operand, a sign bit of the shifted intermediate result, the shifted-out bits, and a mode signal indicative of whether the operand is signed or unsigned. The overflow signal has a first logical value when overflow occurs, and a second logical value in the absence of overflow. The apparatus also includes a clamping circuit for providing a maximum unsigned integer when the overflow signal has the first logical value and the operand is unsigned, a maximum positive signed integer when the overflow signal has the first logical value and the operand is positive and signed, a maximum negative signed integer when the overflow signal has the first logical value and the operand is negative and signed, and the shifted intermediate result when the overflow signal has the second logical value.

50 Claims, 7 Drawing Sheets

LEFT-SHIFTING AN INTEGER OPERAND AND PROVIDING A CLAMPED INTEGER RESULT

BACKGROUND OF THE INVENTION

1. Field of the Invention

The present invention relates to computer arithmetic, and more particularly to left-shifting an integer operand and providing an integer result clamped to a maximum value when overflow occurs.

2. Description of Related Art

Conventional left-shifters are used for fast multiplication by $2^N$ where N is an unsigned integer. Such shifters exploit the fact the operands represented in binary form are composed of bit positions that differ by powers of two. For instance, the bit positions of a four-bit unsigned binary operand typically represent $2^3$, $2^2$, $2^1$ and $2^0$. Therefore, multiplication by $2^N$ can be implemented by left-shifting the operand by N bit positions. When the operand is left-shifted, the least significant bit position is filled with a zero. The left-shifter is usually not large enough to store the entire shifted operand. Consequently, operand bits are often shifted-out of the most significant bit position and discarded, and the result is not always numerically correct. Moreover, often no provision is made for detecting an overflow condition. Various examples of signed operands applied to a conventional left-shifter and left-shifted by one and two bit positions are listed below in Table 1.

is set to 0 if the carry flag equals the high bit of $op_1$. If, however, the shift count is not 1, the overflow flag is undefined. The lack of overflow detection can lead to serious drawbacks.

Referring to FIGS. 1A and 1B, a digital signal processing application that uses 4-bit signed binary numbers generates triangular waveform 102 in the discrete time domain. Triangular waveform 102 is provided by the sequence 0000 (decimal 0), 0010 (decimal 2), 0100 (decimal 4), 0010 (decimal 2) and 0000 (decimal 0). In FIG. 1A, triangular waveform 102 is applied to a digital filter that doubles the amplitude by shifting the numbers one bit position to the left, and the digital filter generates waveform 104 with the sequence 0000 (decimal 0), 0100 (decimal 4), 1000 (decimal −8), 0100 (decimal 4) and 0000 (decimal 0). In FIG. 1B, triangular waveform 102 is applied to a digital filter that quadruples the amplitude by shifting the numbers two bit positions to the left, and the digital filter generates waveform 106 with the sequence 0000 (decimal 0), 1000 (decimal −8), 0000 (decimal 0), 1000 (decimal −8) and 0000 (decimal 0). Unfortunately, high frequency components are inadvertently introduced into waveforms 104 and 106. As a result, waveforms 104 and 106 are extremely distorted and bear little resemblance to waveform 102. Moreover, the high frequency components can be highly disruptive to the digital signal processing application.

Accordingly, a need exists for left-shifting an operand and detecting overflow to reduce numerical inaccuracies in a rapid and efficient manner.

TABLE 1

SIGNED BINARY OPERANDS APPLIED TO CONVENTIONAL LEFT-SHIFTER AND LEFT-SHIFTED BY ONE AND TWO BIT POSITIONS

| Binary Operand (Decimal) | Binary Operand Left-Shifted by One Bit Position — Actual Value (Decimal) | Binary Operand Left-Shifted by One Bit Position After Discarding Shifted-Out Bit (Decimal) | Binary Operand Left-Shifted by Two Bit Positions — Actual Value (Decimal) | Binary Operand Left-Shifted by Two Bit Positions After Discarding Shifted-Out Bit (Decimal) |
|---|---|---|---|---|
| 0010 (decimal 2) | 00100 (decimal 4) | 0100 (decimal 4) | 001000 (decimal 8) | 1000 (decimal −8) |
| 0100 (decimal 4) | 01000 (decimal 8) | 1000 (decimal −8) | 010000 (decimal 16) | 0000 (decimal 0) |
| 0110 (decimal 6) | 01100 (decimal 12) | 1100 (decimal −4) | 011000 (decimal 24) | 1000 (decimal −8) |
| 1110 (decimal −2) | 11100 (decimal −4) | 1100 (decimal −4) | 111000 (decimal −8) | 1000 (decimal −8) |
| 1100 (decimal −4) | 11000 (decimal −8) | 1000 (decimal −8) | 110000 (decimal −16) | 0000 (decimal 0) |
| 1010 (decimal −6) | 10100 (decimal −12) | 0100 (decimal 4) | 101000 (decimal −24) | 1000 (decimal −8) |

Table 1 demonstrates that left-shifting an operand and discarding the shifted-out bit(s) often leads to numerical inaccuracies. Moreover, the shifted operand often has the wrong sign.

"Programming The 80386" by Crawford et al., published by SYBEX Inc., 1987, pp. 241–242, describes an SAL (shift arithmetic left) integer instruction. SAL can be used to rapidly multiply an operand by $2^N$ when N is an unsigned integer. The operand to be shifted is $op_1$, the shift count is specified in $op_2$, and the result is stored in $op_1$. The shift count is masked to 5 bits, and shifts of 0 to 31 bits are performed. During operation, $op_1$ is left-shifted by the shift count and the low-order bits are filled with zero's. The carry flag becomes the value of what is being shifted out of the most significant bit. If the shift count is 1, the overflow flag

SUMMARY OF THE INVENTION

A method and apparatus in accordance with the present invention advantageously provides for left-shifting a signed or unsigned operand by N bit positions to obtain a shifted intermediate result, determining whether overflow occurs, providing a maximum integer value as a clamped integer result when overflow occurs, and providing the shifted intermediate result as the clamped integer result in the absence of overflow. Moreover, the left-shifting and clamped integer result can be provided in a single instruction cycle.

In an embodiment of the invention, a method of operating a circuit to left-shift an integer operand and provide a clamped integer result includes left-shifting the operand by N bit positions, where N is an integer, to obtain a shifted intermediate result and N shifted-out bits. The method also includes providing a maximum unsigned integer as the clamped integer result when any of the shifted-out bits is a one and the operand is unsigned, providing a maximum positive signed integer as the clamped integer result (i) when any of the shifted-out bits is a one and the operand is positive and signed, and (ii) when a most significant bit of the shifted intermediate result is a one and the operand is positive and signed, providing a maximum negative signed integer as the clamped integer result (i) when any of the shifted-out bits is a zero and the operand is negative and signed, and (ii) when a most significant bit of the shifted intermediate result is a zero and the operand is negative and signed, and providing the shifted intermediate result as the clamped integer result (i) when all the shifted-out bits are zero's and the operand is unsigned, (ii) when all the shifted-out bits are zero's and the most significant bit of the shifted intermediate result is a zero and the operand is positive and signed, and (iii) when all the shifted-out bits are one's and the most significant bit of the shifted intermediate result is a one and the operand is negative and signed.

Preferably, the operand consists of M bits, the shifted intermediate result consists of M bits, N is in the range of 0 to M−1, and N least significant bits of the shifted intermediate result are padded with zero's. The maximum unsigned integer is an M-bit word that consists of one's, the maximum positive signed integer is an M-bit word with a zero in a most significant bit position and one's in M−1 least significant bit positions, and the maximum negative signed integer is an M-bit word with a one in a most significant bit position and zero's in M−1 least significant bit positions. In addition, an overflow word includes M−1 overflow bits, the shifted-out bits are shifted into N least significant bit positions of the overflow bits, M−N−1 most significant bit positions of the overflow bits are padded with zero's when the operand is unsigned, and M−N−1 most significant bit positions of the overflow bits are padded with the most significant bit of the operand when the operand is signed.

In another embodiment of the invention, an apparatus that implements the method includes a left-shifter, an overflow detector, and a clamping circuit. The left-shifter left-shifts the operand. The overflow detector generates an overflow signal in response to the sign bit of the operand, the sign bit of the shifted intermediate result, the shifted-out bits, and a mode signal indicative of whether the operand is signed or unsigned. The overflow signal has a first logical value when overflow occurs, and a second logical value in the absence of overflow. The clamping circuit provides one of the maximum unsigned integer, the maximum positive signed integer, and the maximum negative signed integer as the clamped integer result, depending on the sign bit of the operand and the mode signal, when the overflow signal has the first logical value. Otherwise the clamping circuit provides the shifted intermediate result as the clamped integer result when the overflow signal has the second logical value.

A feature of the invention is a range detector that determines whether N is within a maximum shift count. For instance, if the left-shifter is an M-place shifter, the maximum shift count is M−1. When N is in the range of 0 to M−1, then N is within the maximum shift count and the range detector does not affect the overflow detector. However, when N is greater than or equal to M, then N exceeds the maximum shift count and the range detector forces the overflow detector to generate the overflow signal with the first logical value. Furthermore, when N is greater than or equal to M, the left-shifter left-shifts the operand by less than N bit positions, although this has little effect since the overflow signal has the first logical value and therefore the clamping circuit does not provide the shifted intermediate result as the clamped integer result.

Another feature of the invention is that the clamped integer result can be used to represent the operand multiplied by $2^N$ and clamped to a maximum integer value with the same sign as the operand in the event overflow occurs.

The method or apparatus can be configured for signed operands, unsigned operands, or both, as well as with or without range detection of N. For instance, for unsigned operands without range detection, the method includes left-shifting the operand by N bit positions, providing the maximum unsigned integer as the clamped integer result when any of the shifted-out bits is a one, and otherwise providing the shifter intermediate result as the clamped integer result.

These and other aspects, features and advantages of the invention will be further described and more readily apparent from a review of the detailed description of the preferred embodiments which follows.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

The present invention left-shifts an integer operand by N bit positions to obtain a shifted intermediate result and N shifted-out bits. The shifted intermediate result occupies the same bit positions as the pre-shifted operand. Thus, the least significant bit (LSB) of the shifted-out bits is adjacent to the most significant bit (MSB) of the shifted intermediate result. A clamped integer result is provided by a constant when overflow occurs, and provided by the shifted intermediate result when overflow does not occurs. For instance, when the operand is unsigned, the constant is the maximum unsigned integer. When the operand is positive and signed, the constant is the maximum positive signed integer. When the operand is negative and signed, the constant is the maximum negative signed integer.

Preferably, the integer operand is M-bits, the shifted intermediate result is M-bits, the clamped integer result is M-bits, the left-shifter is an M-bit M-place shifter, and N is in the range of 0 to M−1. In this instance, the maximum unsigned integer is an M-bit word that consists of one's, the maximum positive signed integer is an M-bit word with a zero in a most significant bit position and one's in M−1 least significant bit positions, and the maximum negative signed integer is an M-bit word with a one in a most significant bit position and zero's in M−1 least significant bit positions.

When left-shifting occurs, N LSB positions of the shifted intermediate result are padded with zero's. Furthermore, the shifted-out bits are shifted into an overflow word with M−1 overflow bits. Thus, the number of overflow bits does not depend on the shift count. Any overflow bits that do not receive a shifted-out bit are padded with a zero when the operand is unsigned, and padded with the MSB of the operand when the operand is signed. For example, if an unsigned operand is left-shifted by one bit position, the LSB of the shifted intermediate result is padded with a zero, the LSB of the overflow bits is set to the MSB of the operand, and the other overflow bits are padded with zero's.

As used herein, signed numbers are represented in 2's complement form in which positive numbers include zero. Determining whether a signed operand is positive or negative is accomplished by inspecting its MSB (or sign bit). For positive operands the MSB is a zero, whereas for negative operands the MSB is a one. Thus, positive operands includes zero.

Figure 2:
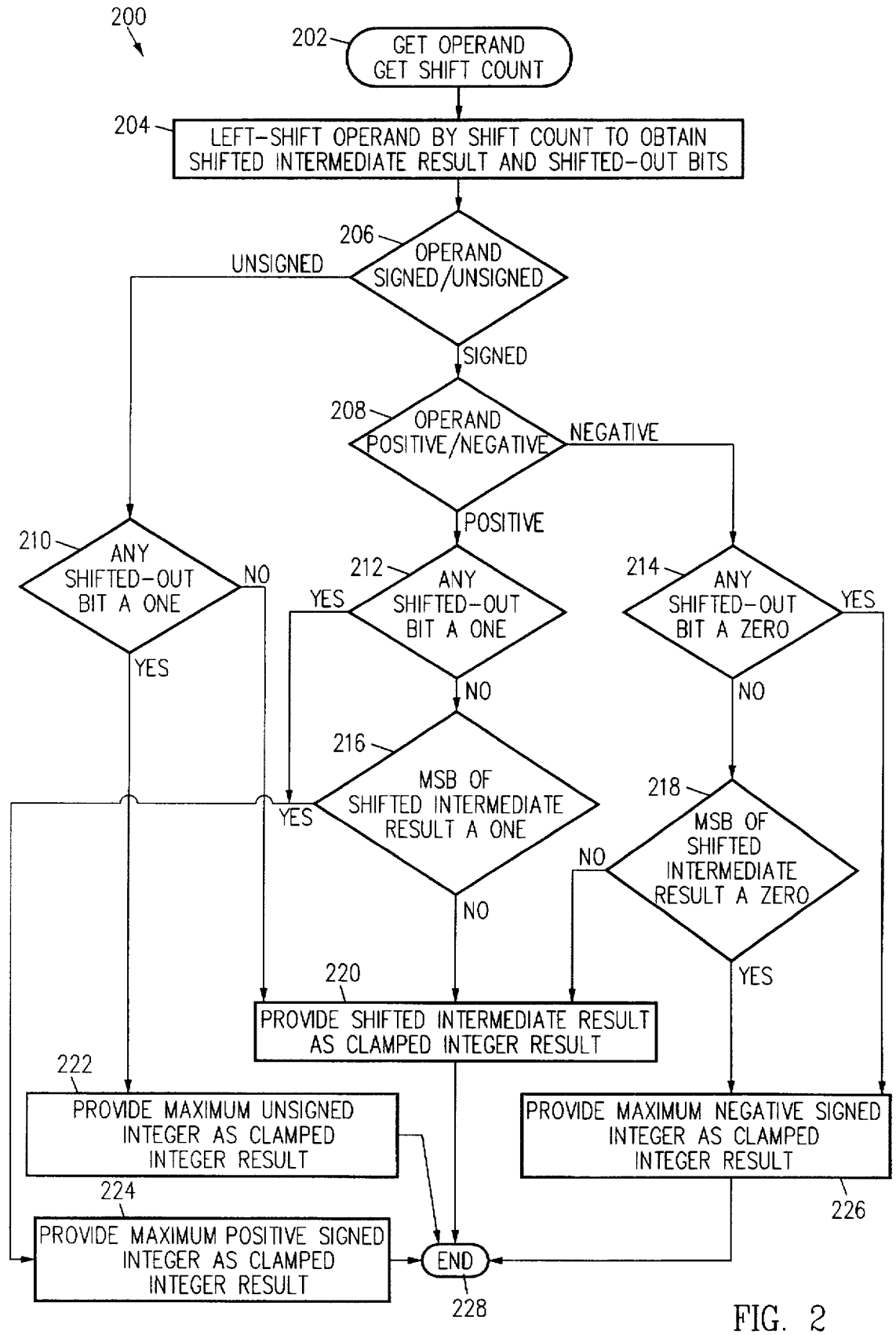
FIG. 2 is a flow chart of an algorithm in accordance with an embodiment of the present invention.

FIG. 2 is a flow chart of algorithm 200 in accordance with an embodiment of the invention. At step 202, a binary integer operand is obtained and a shift count is obtained. The shift count defines how many bit positions the operand shall be left-shifted. At step 204, the operand is left-shifted by the shift count to obtain a shifted intermediate result, and the number of shifted-out bits equals the shift count. Decision step 206 determines whether the operand is signed or unsigned, for instance by inspecting a mode signal. If the operand is signed, decision step 206 branches to decision step 208, and if the operand is unsigned, decision step 206 branches to decision step 210.

Decision step 210 determines whether any shifted-out bit is a one, for instance by ORing all the shifted-out bits. If any shifted-out bit is a one, decision step 210 branches to step 222 which provides a maximum unsigned integer as the clamped integer result, step 222 proceeds to end step 228 and the algorithm terminates. If all shifted-out bits are zero's, decision step 210 branches to step 220 which provides the shifted intermediate result as the clamped integer result, and the algorithm terminates at end step 228.

Decision step 208 determines whether the signed operand is positive or negative, for instance by inspecting its MSB. If the signed operand is positive then decision step 208 branches to decision step 212, whereas if the signed operand is negative then decision step 208 branches to decision step 214. Decision step 212 determines whether any shifted-out bit is a one. If so, decision step 212 branches to step 224 which provides the maximum positive signed integer as the clamped integer result, and the algorithm terminates at end step 228. If not, decision step 212 branches to decision step 216 which determines whether the MSB of the shifted intermediate result is a one. If so, decision step 216 branches to step 224 which provides the maximum positive signed integer as the clamped integer result, and the algorithm terminates at end step 228. If not, decision step 216 branches to step 220 which provides the shifted intermediate result as the clamped integer result and the algorithm terminates at end step 228.

Decision step 214 determines whether any shifted-out bit is a zero, for instance by ANDing all the shifted-out bits. If so, decision step 214 branches to step 226 which provides the maximum negative signed integer as the clamped integer result, and the algorithm terminates at end step 228. If not, decision step 214 branches to decision step 218 which determines whether the MSB of the shifted intermediate result is a zero. If so, decision step 218 branches to step 226 which provides the maximum negative signed integer as the clamped integer result, and the algorithm terminates at end step 228. If not, decision step 218 branches to step 220 which provides the shifted intermediate result as the clamped integer result and the algorithm terminates at end step 228.

Variations to algorithm 200 are apparent. For instance, the shifted-out bits can be inspected before, during, or after inspecting the MSB of the shifted intermediate result. If the shifted-out bits and the MSB of the shifted intermediate result all have the same value then the shifted intermediate result provides the clamped integer result. The maximum unsigned integer, maximum positive signed integer, maximum negative signed integer, and shifted intermediate result can all be available with a selected one provided as the clamped integer result.

Consider the case of unsigned operands in more detail. In this case, overflow occurs when any shifted-out bit is a one. Therefore, the maximum unsigned integer is selected when any of the shifted-out bits is a one, otherwise the shifted intermediate result is selected. In algorithm 200, when the operand is unsigned the algorithm left-shifts the operand and proceeds to decision step 210. Decision step 210 branches to step 222 which provides the maximum unsigned integer as the clamped integer result when any shifted-out bit is a one, and branches to step 220 which provides the shifted intermediate result as the clamped integer result when all the shifted-out bits are zero's.

Consider the case of positive signed operands in more detail. In this case, overflow occurs when any shifted-out bit or the MSB of the shifted intermediate result is a one. Therefore, the maximum positive signed integer is selected when any of the shifted-out bits or the MSB of the shifted intermediate result is a one, otherwise the shifted intermediate result is selected. In algorithm 200, when the operand is positive and signed the algorithm left-shifts the operand and proceeds to decision step 212. The combination of decision steps 212 and 216 leads to step 224 which provides the maximum positive signed integer as the clamped integer result when any shifted-out bit is a one or the MSB of the shifted intermediate result is a one, and leads to step 220 which provides the shifted intermediate result as the clamped integer result when all the shifted-out bits and the MSB of the shifted intermediate result are zero's.

Consider the case of negative signed operands in more detail. In this case, overflow occurs when any shifted-out bit or the MSB of the shifted intermediate result is a zero. Therefore, the maximum negative signed integer is selected when any of the shifted-out bits or the MSB of the shifted intermediate result is a zero, otherwise the shifted intermediate result is selected. In algorithm 200, when the operand is negative and signed the algorithm left-shifts the operand and proceeds to decision step 214. The combination of decision steps 214 and 218 leads to step 226 which provides the maximum negative signed integer as the clamped integer result when any shifted-out bit is a zero or the MSB of the shifted intermediate result is a zero, and leads to step 220 which provides the shifted intermediate result as the clamped integer result when all the shifted-out bits and the MSB of the shifted intermediate result are one's.

Figure 3:
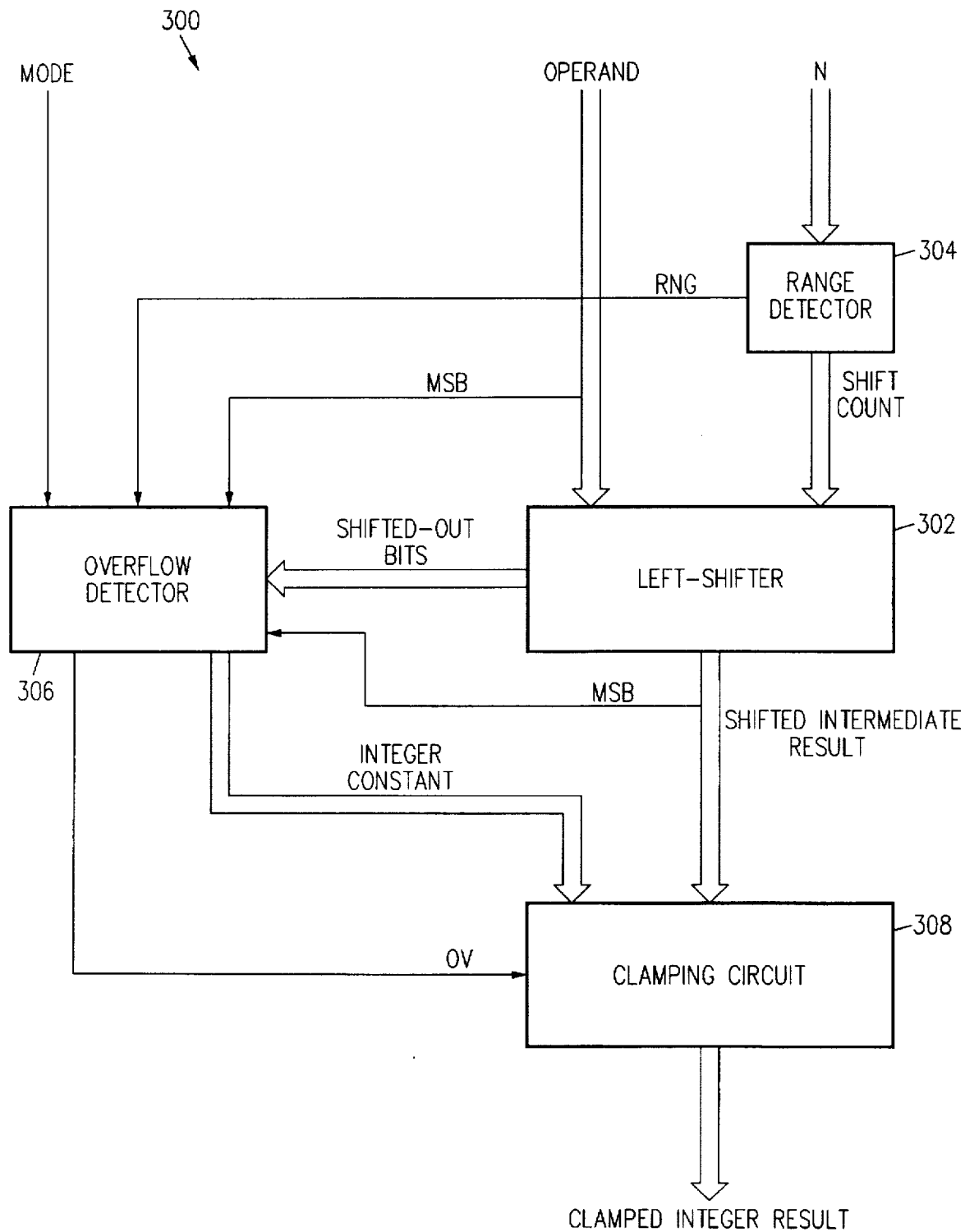
FIG. 3 is a block diagram of a logic circuit in accordance with an embodiment of the present invention.

FIG. 3 is a block diagram of logic circuit 300 for left-shifting an operand and providing a clamped integer result in accordance with an embodiment of the invention. Logic circuit 300 includes left-shifter 302, range detector 304, overflow detector 306 and clamping circuit 308. Left-shifter 302 is an M-bit M-place shifter that receives an M-bit binary integer operand at an operand input and a shift count signal at a shift count input. Left-shifter 302 provides logical left-shifting and inserts a zero at the LSB position of the shifted operand as shifting occurs.

Left-shifter 302 is capable of left-shifting the operand by shift lengths of 0 to M−1 bit positions as specified by the shift count signal. Therefore, left-shifter 302 accepts a shift count signal with $\log_2(M)$ bits at its shift count input. Moreover, when a left-shift occurs, left-shifter 302 provides an M-bit shifted intermediate result and M−1 overflow bits regardless of the shift count. The shifted-out bits are shifted into the overflow bit positions. Any overflow bit that does not receive a shifted-out bit is padded with a zero when the operand is unsigned, and padded with the MSB of the operand when the operand is signed. For example, if an unsigned operand is left-shifted by one bit position, the LSB of the shifted intermediate result is set to zero, the M−1 left-most bits of the shifted intermediate result are set to the M−1 right-most bits of the operand, the LSB of the overflow bits is set to the MSB of the operand, and the M−2 left-most overflow bits are padded with zero's. Alternatively, if an operand is left-shifted by M−1 bit positions, the MSB of the shifted intermediate result is set to the LSB of the operand, the M−1 right-most bits of the shifted intermediate result are set to zero's, and the overflow bits are set to the M−1 left-most bits of the operand.

Left-shifter 302 is conventional and various implementations will be apparent to those skilled in the art. For instance, left-shifter 302 can be implemented as a one-level shifter that operates serially (bit-by-bit). Such a shifter is slow since the shift time is proportional to the shift length. Alternatively, where performance rather than cost is the main issue, left-shifter 302 can be implemented as a multi-level shifter in which parallel shifting is provided using M multiplexers. In this implementation, the shift length controls the multiplexers, and the shift time is determined by the delay through the multiplexers. Furthermore, left-shifter 302 can be a left/right shifter that includes a shift direction input, although right-shifting is not essential to the present invention.

Range detector 304 receives an unsigned operand N composed of high-order and low-order bits. By definition, the high-order bits are a string of adjacent bits that include the MSB, the low-order bits are a string of adjacent bits that include the LSB, and the least significant high-order bit is adjacent to the most significant low-order bit. Left-shifter 302 is an M-place shifter with a maximum shift count of M−1. Therefore, left-shifter 302 accepts a shift count signal with $\log_2(M)$ bits at its shift count input. Accordingly, range detector 304 generates a shift count signal of $\log_2(M)$ bits, which happen to be the low-order bits of N.

Suppose, for example, that N is a 32-bit word, the operand is a 32-bit word, and left-shifter 302 is a 32-place shifter with a maximum shift count of 31. In this instance, shift counts of 0 to 31 are within the maximum shift count, and the maximum number of bits that left-shifter 302 accepts at its shift count input is $\log_2(32)$, or 5 bits. As a result, N consists of 27 high-order bits (at bit positions $2^{31}$ to $2^5$) and 5 low-order bits (at bit positions $2^4$ to $2^0$). Range detector 304 transfers the 5 low-order bits as the shift count signal to left-shifter 302.

Range detector 304 also provides an overrange signal (RNG). When N exceeds the maximum shift count of left-shifter 302, then overflow occurs since left-shifter 302 cannot provide a large enough shift, and range detector 304 sets the overrange signal to a one. Thus, range detector 304 sets the overrange signal to a one when any of the high-order bits of N is a one. Range detector 304 can be implemented using simple combinatorial logic. For instance, the high-order bits of N can be applied to an OR gate, the output of the OR gate can provide the overrange signal.

Overflow detector 306 receives the shifted-out bits from left-shifter 302, the MSB of the operand, the MSB of the shifted intermediate result, the overrange signal, and a mode signal (MODE). The mode signal is a one for signed operands, and a zero for unsigned operands.

Overflow detector 306 contains combinatorial logic which generates an overflow signal (OV) at a first output, and an integer constant at a second output. The overflow signal is a one when clamping circuit 308 needs to select the integer constant, and the overflow signal is a zero when clamping circuit 308 needs to select the shifted intermediate result. The overflow signal is always set to a one when the overrange signal is a one. A truth table for the overflow signal when the overrange signal is a zero is listed below in Table 2.

TABLE 2

TRUTH TABLE FOR OVERFLOW SIGNAL OF OVERFLOW
DETECTOR 306 WHEN OVERRANGE SIGNAL IS A ZERO

| ROW | MODE | MSB of Operand | MSB of Shifted Intermediate Result | OR of Shifted-Out Bits | AND of Shifted-Out Bits | OV |
|---|---|---|---|---|---|---|
| 1 | 0 | 0 | 0 | 0 | 0 | 0 |
| 2 | 0 | 0 | 0 | 0 | 1 | N/A |
| 3 | 0 | 0 | 0 | 1 | 0 | 1 |
| 4 | 0 | 0 | 0 | 1 | 1 | N/A |
| 5 | 0 | 0 | 1 | 0 | 0 | 0 |
| 6 | 0 | 0 | 1 | 0 | 1 | N/A |
| 7 | 0 | 0 | 1 | 1 | 0 | 1 |
| 8 | 0 | 0 | 1 | 1 | 1 | N/A |
| 9 | 0 | 1 | 0 | 0 | 0 | 0 |
| 10 | 0 | 1 | 0 | 0 | 1 | N/A |
| 11 | 0 | 1 | 0 | 1 | 0 | 1 |
| 12 | 0 | 1 | 0 | 1 | 1 | 1 |
| 13 | 0 | 1 | 1 | 0 | 0 | 0 |
| 14 | 0 | 1 | 1 | 0 | 1 | N/A |
| 15 | 0 | 1 | 1 | 1 | 0 | 1 |
| 16 | 0 | 1 | 1 | 1 | 1 | 1 |
| 17 | 1 | 0 | 0 | 0 | 0 | 0 |
| 18 | 1 | 0 | 0 | 0 | 1 | N/A |
| 19 | 1 | 0 | 0 | 1 | 0 | 1 |
| 20 | 1 | 0 | 0 | 1 | 1 | N/A |
| 21 | 1 | 0 | 1 | 0 | 0 | 1 |
| 22 | 1 | 0 | 1 | 0 | 1 | N/A |
| 23 | 1 | 0 | 1 | 1 | 0 | 1 |
| 24 | 1 | 0 | 1 | 1 | 1 | N/A |
| 25 | 1 | 1 | 0 | 0 | 0 | 1 |
| 26 | 1 | 1 | 0 | 0 | 1 | N/A |
| 27 | 1 | 1 | 0 | 1 | 0 | 1 |
| 28 | 1 | 1 | 0 | 1 | 1 | 1 |
| 29 | 1 | 1 | 1 | 0 | 0 | 1 |
| 30 | 1 | 1 | 1 | 0 | 1 | N/A |
| 31 | 1 | 1 | 1 | 1 | 0 | 1 |
| 32 | 1 | 1 | 1 | 1 | 1 | 0 |

As seen in Table 2, some rows are not applicable. Rows 2, 6, 10, 14, 18, 22, 26 and 30 are not applicable since the AND of the shifted-out bits will not be a one when the OR of the shifted-out bits is a zero. Similarly, rows 2, 4, 6, 8, 18, 20, 22 and 24 are not applicable since the AND of the shifted-out bits will not be a one when the MSB of the operand is a zero. Nonetheless, the applicable rows indicate that, when the overrange signal is a zero, overflow detector 306 sets the overflow signal to a one (i) when any of the shifted-out bits is a one and the operand is unsigned, (ii) when any of the shifted-out bits is a one or the MSB of the shifted intermediate result is a one and the operand is positive and signed, and (iii) when any of the shifted-out bits is a zero or the most significant bit of the shifted intermediate result is a zero and the operand is negative and signed, and otherwise overflow detector 306 sets the overflow signal to a zero.

Overflow detector 306 generates the integer constant as the maximum unsigned integer when the operand is unsigned, the maximum positive signed integer when the operand is positive and signed, and the maximum negative signed integer when the operand is negative and signed. A truth table for the integer constant of overflow detector 306 is listed below in Table 3.

TABLE 3

TRUTH TABLE FOR INTEGER CONSTANT OF OVERFLOW DETECTOR 306

| MODE | MSB of Operand | Integer Constant |
|---|---|---|
| 0 | 0 | Maximum Unsigned Integer |
| 0 | 1 | Maximum Unsigned Integer |
| 1 | 0 | Maximum Positive Signed Integer |
| 1 | 1 | Maximum Negative Signed Integer |

Suppose the operand (A) includes bits $A_{MSB} \ldots A_0$, the shifted intermediate result includes bits $I_{MSB} \ldots I_0$, the shifted-out bits are the left-most bits (or LSBs) of an overflow word (O) that includes bits $O_{MSB} \ldots O_0$, and the integer constant (C) includes bits $C_{MSB} \ldots C_0$. Overflow detector 306 generates the overflow signal as follows:

$$OV = RNG + (\overline{MODE} \cdot (O_{MSB} + \ldots + O_0)) + (MODE \cdot ((I_{MSB} + O_{MSB} + \ldots + O_0) \oplus (I_{MSB} \cdot O_{MSB} \cdot \ldots \cdot O_0))) \quad (1)$$

Overflow detector 306 generates the integer constant as follows:

$$C_{MSB} = \overline{MODE} + A_{MSB} \quad (2)$$

$$C_{MSB-1} = \ldots = C_0 = \overline{MODE \cdot A_{MSB}} \quad (3)$$

Clamping circuit 308 receives the shifted intermediate result, the overflow signal, and the integer constant. Clamping circuit 308 provides the integer constant at an output when the overflow signal is a one, and provides the shifted intermediate result at the output when the overflow signal is a zero. Clamping circuit 308 can be implemented, for instance, as a conventional 2:1 multiplexer that receives the integer constant at a first operand input, the shifted intermediate result at a second operand input, and the overflow signal at a select input.

Alternatively, if desired, the combinatorial logic that generates the integer constant can be part of the clamping circuit, the mode signal and the most significant bit of the operand can be applied to the clamping circuit, and the clamping circuit can include a conventional 4:1 multiplexer that selects one of the maximum unsigned integer, the maximum positive signed integer, the maximum negative signed integer, and the shifted intermediate result in response to the overflow signal, the mode signal and the most significant bit of the operand.

FIGS. 4A–4D are a circuit diagram of logic circuit 400 for implementing a 4-bit version of logic circuit 300. In logic circuit 400, the operand A consists of bits $A_3$, $A_2$, $A_1$ and $A_0$, the integer N consists of bits $N_3$, $N_2$, $N_1$ and $N_0$, the overflow word consists of bits $O_2$, $O_1$ and $O_0$, the shifted intermediate result consists of bits $I_3$, $I_2$, $I_1$ and $I_0$ the integer constant consists of bits $C_3$, $C_2$, $C_1$ and $C_0$, and the clamped integer result consists of bits $R_3$, $R_2$, $R_1$ and $R_0$.

Figure 4A:
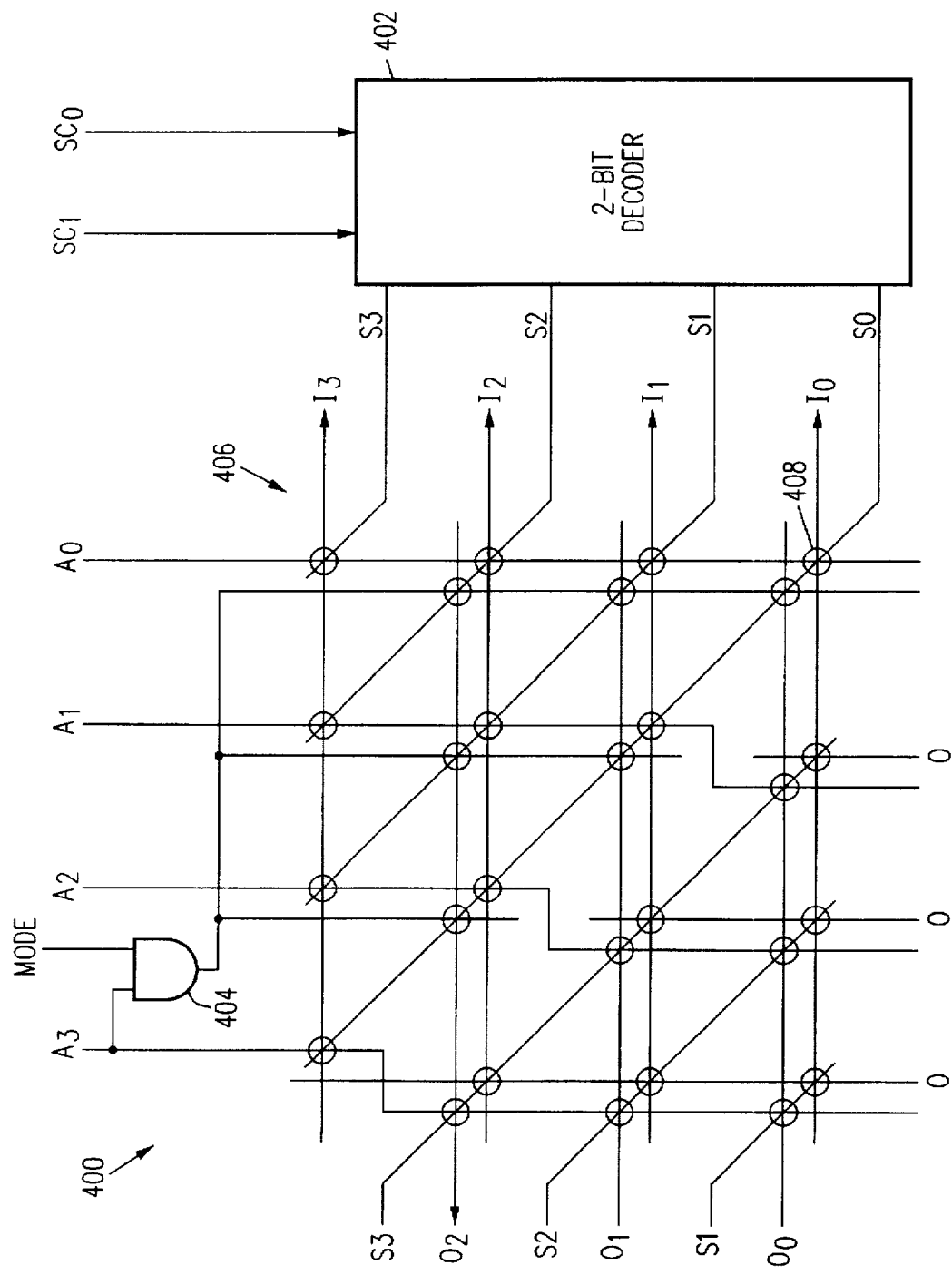
FIGS. 4A–4D are a circuit diagram of a logic circuit for implementing the logic circuit of FIG. 3.

In FIG. 4A, left-shifter 302 is implemented with 2-bit decoder 402, AND gate 404 and shifter 406. Decoder 402 receives shift count bits $SC_1$, and $SC_0$, and generates shift count signals S0, S1, S2 and S3. The truth table for decoder 402 is listed below in Table 4.

TABLE 4

TRUTH TABLE FOR DECODER 402

| $SC_1$ | $SC_0$ | Shift Signal | Shift Count |
|---|---|---|---|
| 0 | 0 | S0 | 0 |
| 0 | 1 | S1 | 1 |
| 1 | 0 | S2 | 2 |
| 1 | 1 | S3 | 3 |

That is, when bits $SC_1$ and $SC_0$ are zero's then signal S0 is a one and signals S1, S2 and S3 are zero's, etc. Signal S3 instructs shifter 406 to shift-left by 3 bit positions, signal S2 instructs shifter 406 to shift-left by 2 bit positions, signal S1 instructs shifter 406 to shift-left by one bit position, and signal S0 instructs shifter 406 not to shift.

AND gate 404 receives bit $A_3$ and the mode signal. Thus, AND gate 404 generates a zero when A unsigned, generates a zero when A is positive and signed, and generates a one when A is negative and signed.

Shifter 406 is a 4-bit, 4-place left-shifter that shifts between 0 to 3 bit positions. Shifter 406 includes vertical lines that receive operand bits $A_3$, $A_2$, $A_1$ and $A_0$, vertical lines that receive the output of AND gate 404, vertical lines set to zero, diagonal lines that receive shift signals S3, S2, S1 and S0, horizontal lines that provide shifted intermediate result bits $I_3$, $I_2$, $I_1$ and $I_0$, and horizontal lines that provide overflow bits $O_2$, $O_1$ and $O_0$. Connection nodes represented by circles are disposed at selected intersections of the horizontal, vertical, and diagonal lines. At each connection node, the intersecting horizontal and vertical lines are electrically coupled to one another when the intersecting diagonal line is set to a one, and the intersecting horizontal and vertical lines are electrically isolated from one another when the intersecting diagonal line is set to a zero. For instance, connection node 408 is disposed at the intersection of the horizontal line for bit $I_0$, the vertical line for bit $A_0$ and the diagonal line for signal S0. When Signal S0 is a one, bit $A_0$ is transferred (or shifted to bit $I_0$. When signal S0 is a zero, bit $A_0$ has no effect on bit $I_0$.

Figure 5:
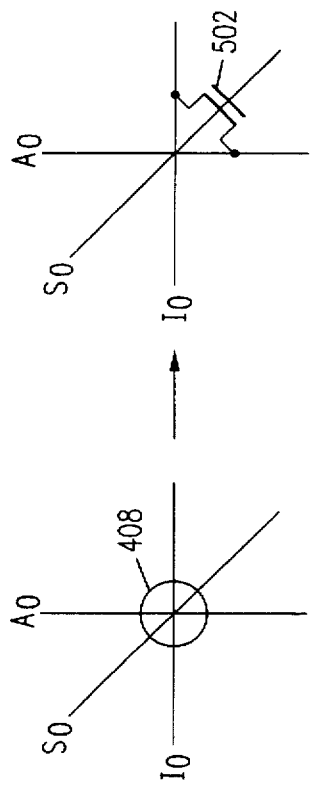
FIG. 5 is an illustration of a connection node in FIG. 4A.

In FIG. 5, connection node 408 is illustrated in more detail. As is seen, connection node 408 includes MOSFET 502 with a source coupled to the vertical line for bit $A_0$, a drain coupled to the horizontal line for bit $I_0$, and a gate coupled to the diagonal line for signal S0. When signal S0 is one, MOSFET 502 turns on and couples the horizontal and vertical lines. When signal S0 is a zero, MOSFET 502 turns off and decouples the horizontal and vertical lines.

Returning to FIG. 4A, the integer bits and the overflow bits depend on the operand bits, the shift count bits, and the mode signal. For example, when signal S0 is a one and signals S1, S2 and S3 are zero's and the mode signal is a zero, then bits $I_3$, $I_2$, $I_1$ and $I_0$ are set to bits $A_3$, $A_2$, $A_1$ and $A_0$, respectively, and bits $O_2$, $O_1$ and $O_0$ are padded with zero's. As another example, when signal S2 is a one and signals S0, S1 and S3 are zero's and the mode signal is a one, then bits $I_3$, $I_2$, $I_1$ and $I_0$ and set to bits $A_1$ and $A_0$ and a pair of zero's, respectively, and bits $O_2$, $O_1$ and $O_0$ are set to bits $A_3$, $A_3$ and $A_2$, respectively. The truth table for shifter 406 is listed below in Table 5.

TABLE 5

TRUTH TABLE FOR SHIFTER 406

| MODE | Shift Signal | Overflow Bits $O_2$ | $O_1$ | $O_0$ | Shifted Bits $I_3$ | $I_2$ | $I_1$ | $I_0$ |
|---|---|---|---|---|---|---|---|---|
| 0 | S0 | 0 | 0 | 0 | $A_3$ | $A_2$ | $A_1$ | $A_0$ |
| 0 | S1 | 0 | 0 | $A_3$ | $A_2$ | $A_1$ | $A_0$ | 0 |
| 0 | S2 | 0 | $A_3$ | $A_2$ | $A_1$ | $A_0$ | 0 | 0 |
| 0 | S3 | $A_3$ | $A_2$ | $A_1$ | $A_0$ | 0 | 0 | 0 |
| 1 | S0 | $A_3$ | $A_3$ | $A_3$ | $A_3$ | $A_2$ | $A_1$ | $A_0$ |
| 1 | S1 | $A_3$ | $A_3$ | $A_3$ | $A_2$ | $A_1$ | $A_0$ | 0 |
| 1 | S2 | $A_3$ | $A_3$ | $A_2$ | $A_1$ | $A_0$ | 0 | 0 |
| 1 | S3 | $A_3$ | $A_2$ | $A_1$ | $A_0$ | 0 | 0 | 0 |

Figure 4C:
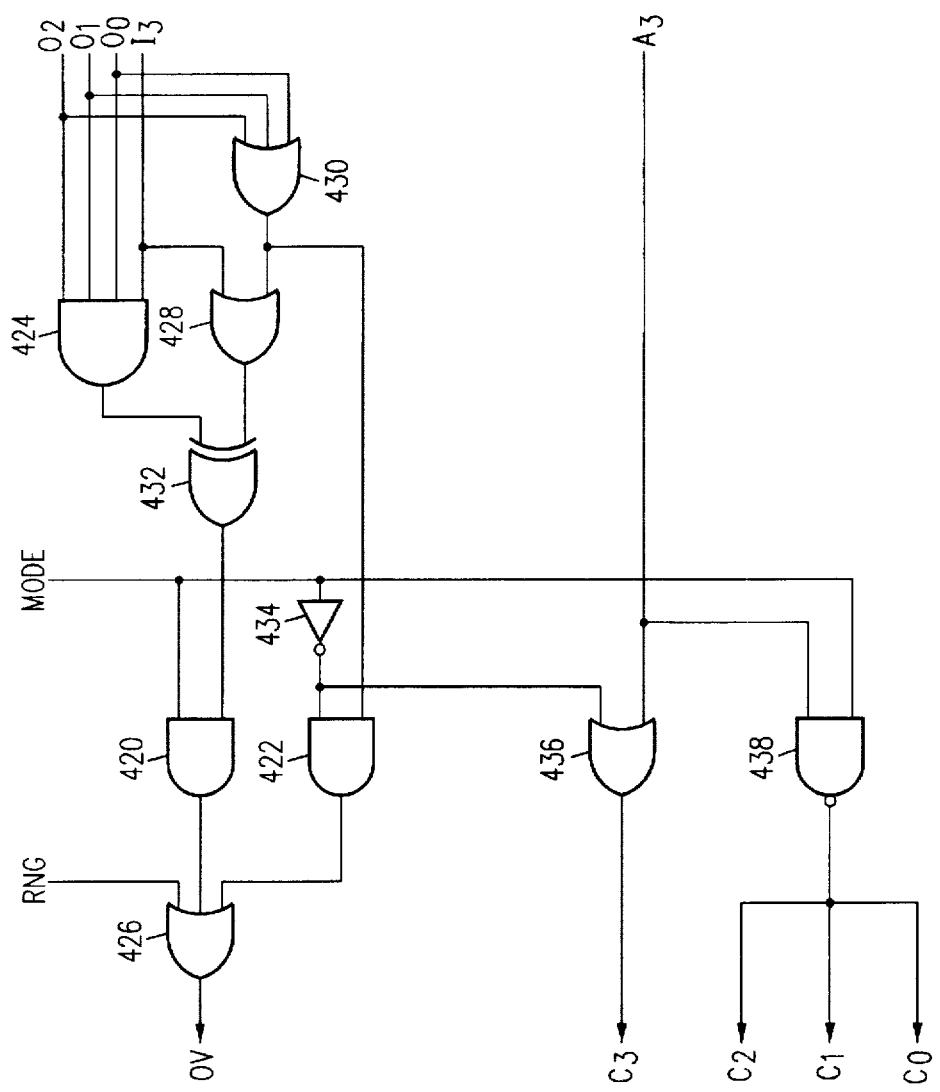
Figure 4B:
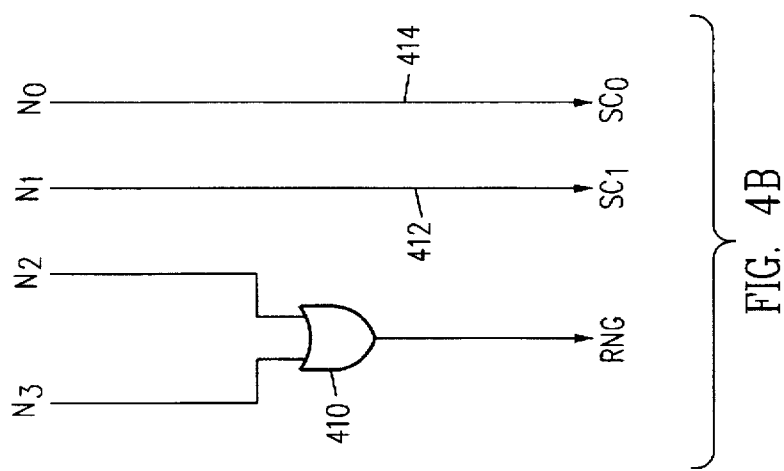

In FIG. 4B, range detector 304 is implemented using OR gate 410 and signal lines 412 and 414. High-order bits $N_3$ and $N_2$ are applied to OR gate 410, and low-order bits $N_1$, and $N_0$ are applied to signal lines 412 and 414. OR gate 410 generates the overrange signal, and signal lines 412 and 414 transfer bits $N_1$ and $N_0$ as shift count bits $SC_1$ and $SC_0$.

In FIG. 4C, overflow detector 306 is implemented using AND gates 420, 422 and 424, OR gates 426, 428 and 430, XOR (eXclusive-OR) gate 432 and inverter 434 to generate the overflow signal, and inverter 434, OR gate 436, and NAND gate 438 to generate the integer constant. OR gate 426 provides the overflow signal as follows:

$$OV = RNG + (\overline{MODE} \cdot (O_2 + O_1 + O_0)) + (MODE \cdot ((I_3 + O_2 + O_1 + O_0) \oplus (I_3 \cdot O_2 \cdot O_1 \cdot O_0))) \quad (4)$$

OR gate 436 provides bit $C_3$ as follows:

$$C_3 = \overline{MODE} + A_3 \quad (5)$$

NAND gate 438 provides bits $C_2$, $C_1$ and $C_0$ as follows:

$$C_2 = C_1 = C_0 = \overline{MODE \cdot A_3} \quad (6)$$

Figure 4D:
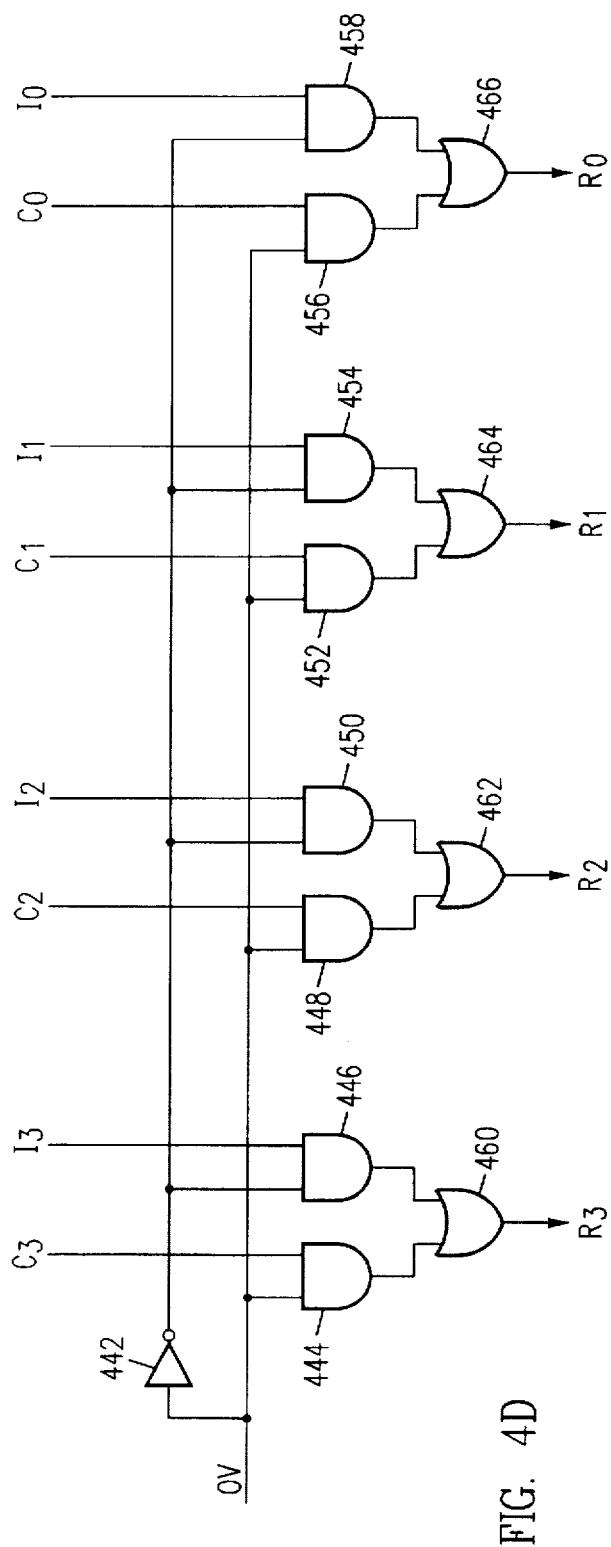

In FIG. 4D, clamping circuit 308 is implemented as a 2:1 multiplexer using inverter 442, AND gates 444, 446, 448, 450, 452, 454, 456 and 458, and OR gates 460, 462, 464 and 466. Bits $C_3$, $C_2$, $C_1$ and $C_0$ are applied to AND gates 444, 448, 452 and 456, respectively, and bits $I_3$, $I_2$, $I_1$ and $I_0$ are applied to AND gates 446, 450, 454 and 458, respectively. In addition, the overflow signal is applied to AND gates 444, 448, 452 and 456, and the bit-complement of the overflow signal is applied to AND gates 446, 450, 454 and 458. The outputs of AND gates 444 and 446 are applied to OR gate 460 which provides bit $R_3$, the outputs of AND gates 448 and 450 are applied to OR gate 462 which provides bit $R_2$, the outputs of AND gates 452 and 454 are applied to OR gate 464 which provides bit $R_1$, and the outputs of AND gates 456 and 458 are applied to OR gate 466 which provides bit $R_0$. Thus, bits $R_3$, $R_2$, $R_1$ and $R_0$ are set to bits $C_3$, $C_2$, $C_1$, and $C_0$, respectively, when the overflow signal is a one, and set to bits $I_3$, $I_2$, $I_1$ and $I_0$, respectively, when the overflow signal is a zero.

Figure 1A:
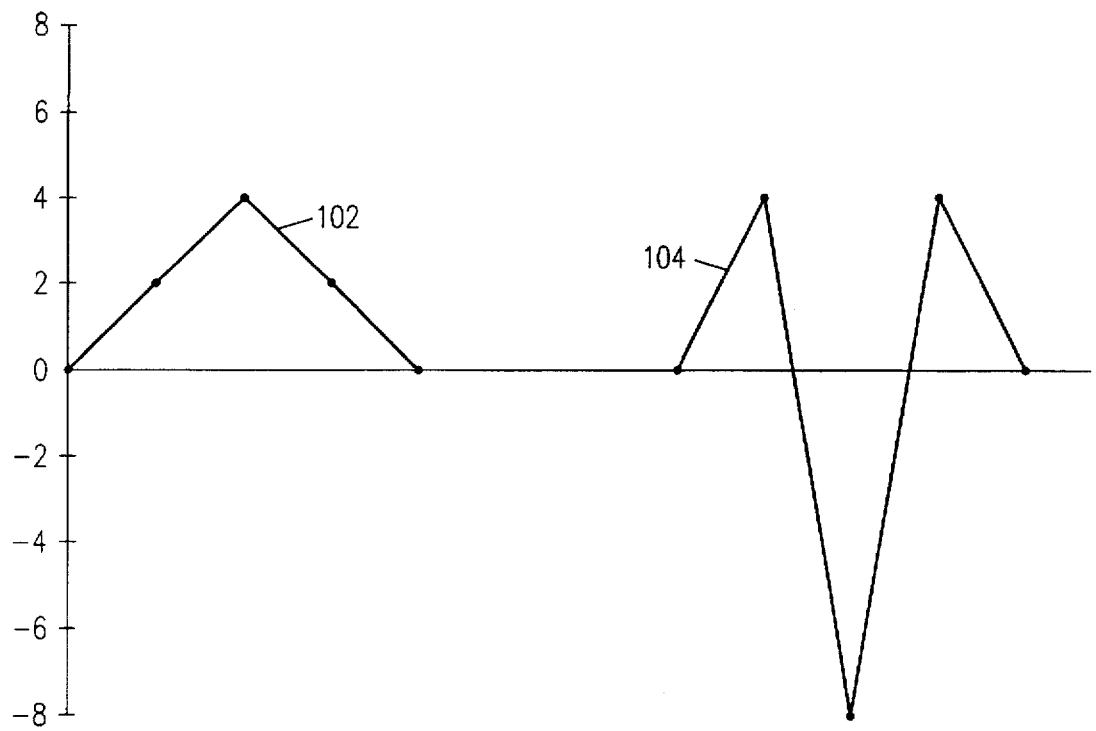
FIGS. 1A–1B illustrate applying a triangular waveform to a conventional left-shifter.
Figure 1B:
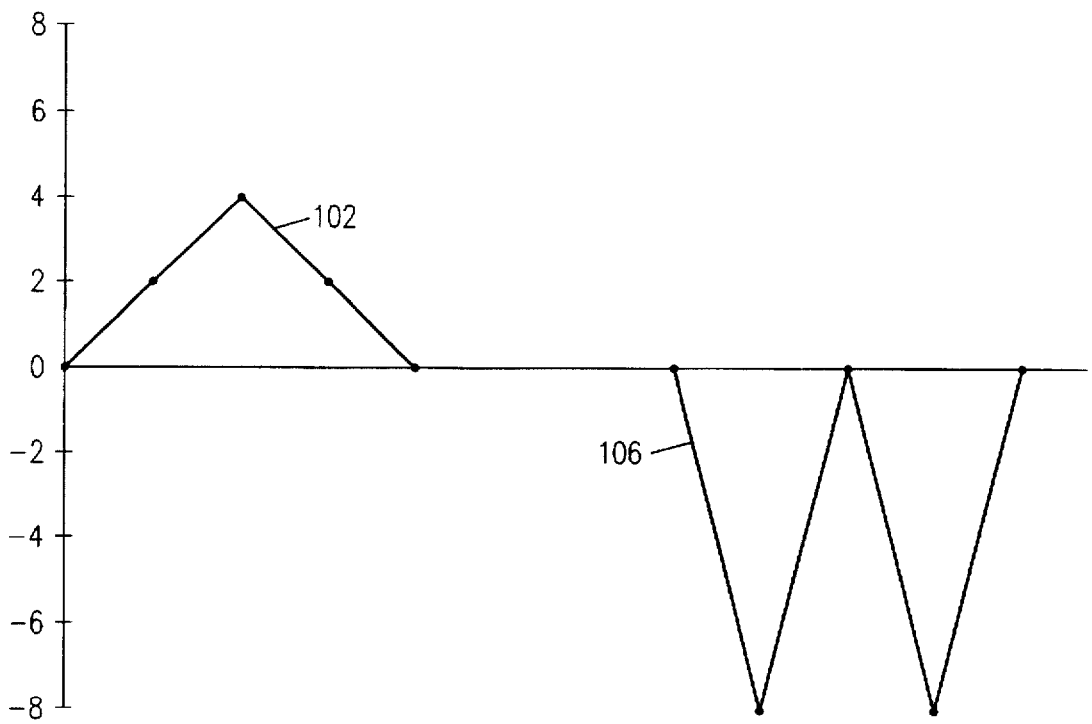
Figure 1C:
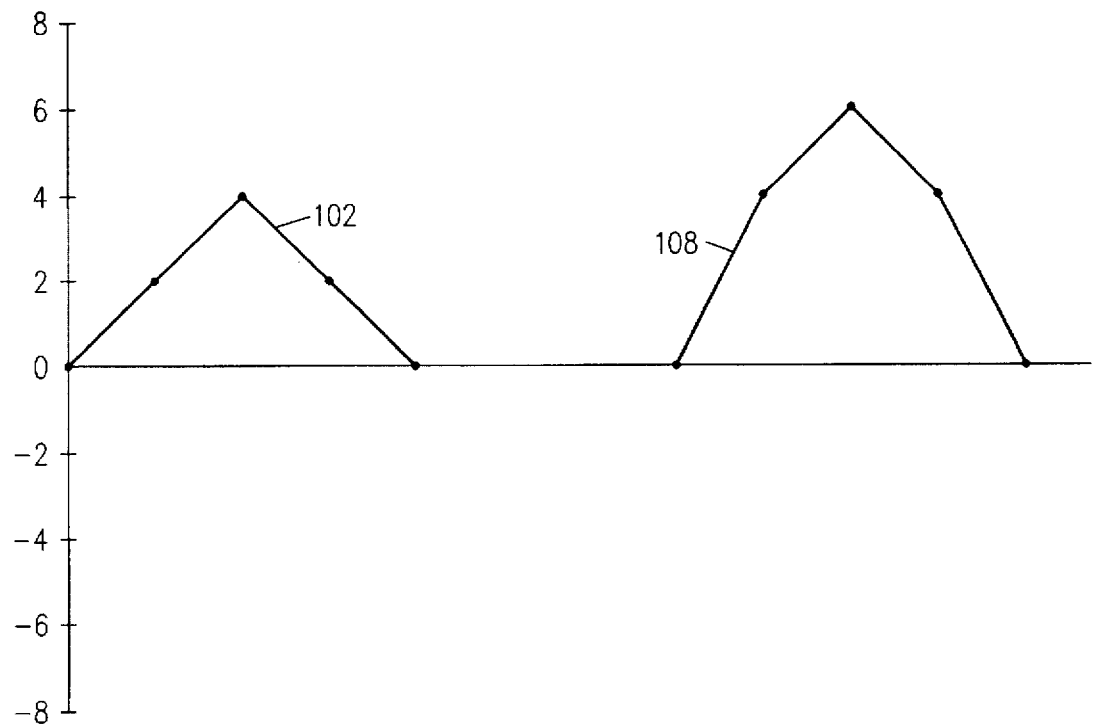
FIGS. 1C–1D illustrate applying a triangular waveform to an apparatus in accordance with an embodiment of the present invention.
Figure 1D:
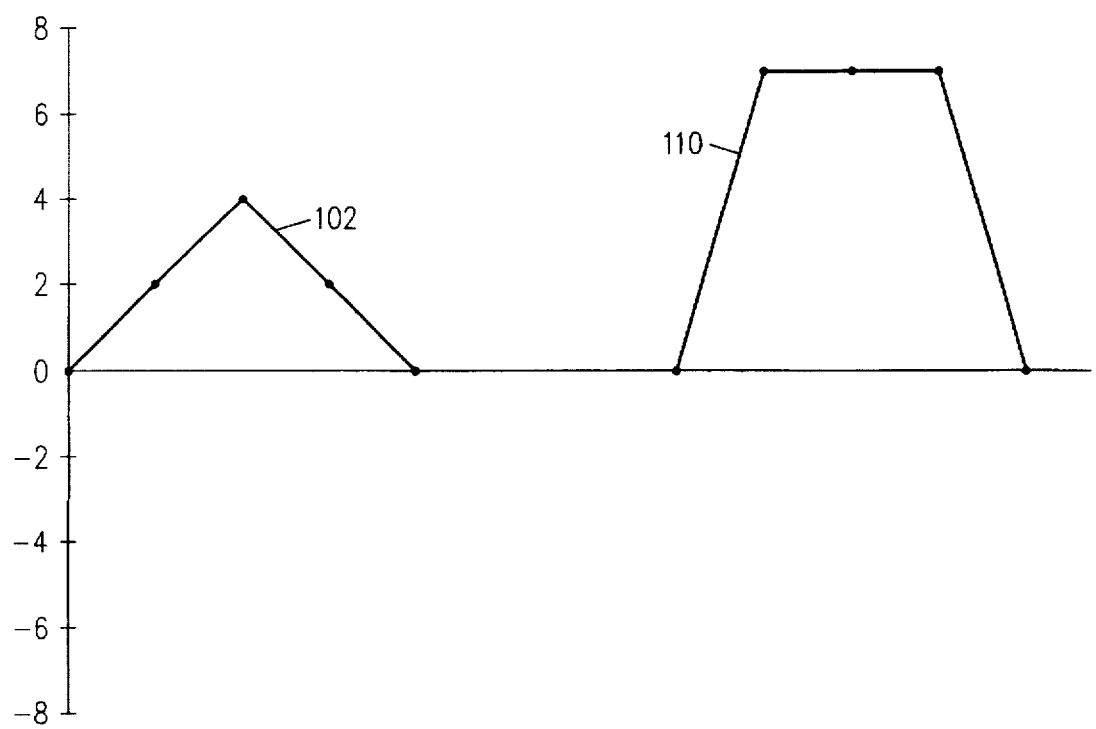

Referring to FIGS. 1C and 1D, a digital signal processing application that uses 4-bit signed binary numbers generates triangular waveform 102 in the discrete time domain. Triangular waveform 102 is provided by the sequence 0000 (decimal 0), 0010 (decimal 2), 0100 (decimal 4), 0010 (decimal 2) and 0000 (decimal 0). In FIG. 1C, triangular waveform 102 is applied to logic circuit 400, and the shift count is set to one in order to double the amplitude by shifting the numbers one bit position to the left. Logic circuit 400 generates waveform 108 with the sequence 0000 (decimal 0), 0100 (decimal 4), 0111 (decimal 7), 0100 (decimal 4) and 0000 (decimal 0). In FIG. 1D, triangular waveform 102 is applied to logic circuit 400, and the shift count is set to two in order to quadruple the amplitude by shifting the numbers two bit positions to the left. Logic circuit 400 generates waveform 110 with the sequence 0000 (decimal 0), 0111 (decimal 7), 0111 (decimal 7), 0111 (decimal 7) and 0000 (decimal 0). As is seen, waveforms 108 and 110 are clamped to the maximum positive signed integer of 0111 (decimal 7) and are therefore distorted. However, waveforms 108 and 110 still resemble waveform 102. Moreover, waveforms 108 and 110 are devoid of the high frequency components found in waveforms 104 and 106.

It is understood that coupling a signal to an input, such that the input responds to the signal, includes applying the signal to the input as well as applying a related signal to the input as long as functionality is preserved. For instance, coupling the overflow signal to the clamping circuit includes coupling the overflow signal to a multiplexer that selects the integer constant or the shifted intermediate result in response to a one and zero, respectively, as well as applying the bit-complement of the overflow signal to a multiplexer that selects the integer constant or the shifted intermediate result in response to a zero and one, respectively.

It is also understood that left-shifting refers to shifting towards the MSB position, and right-shifting refers to shifting towards the LSB position.

It is further understood that various bits can be stored in registers. For instance, a register can be disposed between left-shifter 302 and clamping circuit 308 to store the shifted intermediate result. In this manner, the shifted intermediate result and the shifted-out bits can be provided during a first instruction cycle, and the clamped integer result can be provided during a second instruction cycle.

The shifter can implement multiplication and/or division. See, for instance, U.S. application Ser. No. 08/731,654, filed concurrently herewith, entitled "Arithmetic Shifter that Performs Multiply/Divide by $2^N$ for Positive and Negative N" by R. Wong, which is incorporated herein by reference. Furthermore, various rounding techniques can be used with the present invention in the event the operand is right-shifted. See, for instance, U.S. application Ser. No. 08/731, 652, filed concurrently herewith, entitled "Right-Shifting an Integer Operand and Rounding a Fractional Intermediate Result to Obtain a Rounded Integer Result" by R. Wong, which is incorporated herein by reference.

The description of the invention set forth herein is illustrative, and is not intended to limit the scope of the invention as set forth in the following claims. For example, left-shifter 302, range detector 304, overflow detector 306 and clamping circuit 308 may be implemented in any suitable circuitry. A general purpose computer or processor can execute the invention in a single instruction cycle (as is preferred) or multiple instruction cycles. The invention is well-suited for many applications besides digital signal processing. Variations and modifications of the embodiments disclosed herein may be made based on the description set forth herein, without departing from the scope and spirit of the invention as set forth in the following claims.

What is claimed is:

1. A method of operating a circuit to left-shift an unsigned integer operand and provide a clamped integer result, comprising:

13 left-shifting the operand by N bit positions, where N is an integer, to obtain a shifted intermediate result and N shifted-out bits; and providing a maximum unsigned integer as the clamped integer result when any of the shifted-out bits is a one, and providing the shifted intermediate result as the clamped integer result when all the shifted-out bits are zero's.

2. The method of claim 1, wherein N is in the range of 0 to M−1, the operand consists of M bits, the shifted intermediate result consists of M bits, N least significant bits of the shifted intermediate result are padded with zero's, and the maximum unsigned integer is an M-bit string of one's.

3. The method of claim 2, wherein an overflow word includes M−1 overflow bits, the shifted-out bits are shifted into N least significant bit positions of the overflow bits, and M−N−1 most significant bit positions of the overflow bits are padded with zero's.

4. The method of claim 1, wherein the previously recited steps are performed when N is within a maximum shift count, and including providing the maximum unsigned integer as the clamped integer result when N exceeds the maximum shift count.

5. The method of claim 1, wherein:

an overflow detector generates an overflow signal with a first logical value when any of the shifted-out bits is a one, and with a second logical value when all the shifted-out bits are zero's; and a clamping circuit provides the maximum unsigned integer as the clamped integer result when the overflow signal has the first logical value, and provides the shifted intermediate result as the clamped integer result when the overflow signal has the second logical value.

6. The method of claim 1, wherein the clamped integer result is used to represent the operand multiplied by $2_N$.

7. The method of claim 1, performed in a single instruction cycle.

8. A method of operating a circuit to left-shift a signed integer operand and provide a clamped integer result, comprising:

left-shifting the operand by N bit positions, where N is an integer, to obtain a shifted intermediate result and N shifted-out bits;

providing a maximum positive signed integer as the clamped integer result (i) when any of the shifted-out bits is a one and the operand is positive, and (ii) when a most significant bit of the shifted intermediate result is a one and the operand is positive;

providing a maximum negative signed integer as the clamped integer result (i) when any of the shifted-out bits is a zero and the operand is negative, and (ii) when the most significant bit of the shifted intermediate result is a zero and the operand is negative; and providing the shifted intermediate result as the clamped integer result (i) when all the shifted-out bits are zero's and the most significant bit of the shifted intermediate result is a zero and the operand is positive, and (ii) when all the shifted-out bits are one's and the most significant bit of the shifted intermediate result is a one and the operand is negative.

9. The method of claim 8, wherein N is in the range of 0 to M−1, the operand consists of M bits, the shifted intermediate result consists of M bits, N least significant bits of the shifted intermediate result are padded with zero's, the maximum positive signed integer is an M-bit word with a zero in a most significant bit position and one's in M−1 least

14 significant bit positions, and the maximum negative signed integer is an M-bit word with a one in a most significant bit position and zero's in M−1 least significant bit positions.

10. The method of claim 9, wherein an overflow word includes M−1 overflow bits, the shifted-out bits are shifted into N least significant bit positions of the overflow bits, and M−N−1 most significant bit positions of the overflow bits are padded with a most significant bit of the operand.

11. The method of claim 8, wherein the previously recited steps are performed when N is within a maximum shift count, and including providing the maximum positive signed integer as the clamped integer result when N exceeds the maximum shift count and the operand is positive, and providing the maximum negative signed integer as the clamped integer result when N exceeds the maximum shift count and the operand is negative.

12. The method of claim 8, wherein:

an overflow detector generates an overflow signal with a first logical value (i) when any of the shifted-out bits is a one and the operand is positive, (ii) when the most significant bit of the shifted intermediate result is a one and the operand is positive, (iii) when any of the shifted-out bits is a zero and the operand is negative, and (iv) when the most significant bit of the shifted intermediate result is a zero and the operand is negative, and otherwise generates the overflow signal with a second logical value; and a clamping circuit provides the maximum positive signed integer as the clamped integer result when the overflow signal has the first logical value and the operand is positive, provides the maximum negative signed integer as the clamped integer result when the overflow signal has the first logical value and the operand is negative, and provides the shifted intermediate result as the clamped integer result when the overflow signal has the second logical value.

13. The method of claim 8, wherein the clamped integer result is used to represent the operand multiplied by $2^N$.

14. The method of claim 8, performed in a single instruction cycle.

15. A method of operating a circuit to left-shift an integer operand and provide a clamped integer result, comprising:

providing a mode signal that indicates whether the operand is signed or unsigned;

left-shifting the operand by N bit positions, where N is an integer, to obtain a shifted intermediate result and N shifted-out bits;

providing a maximum unsigned integer as the clamped integer result when any of the shifted-out bits is a one and the operand is unsigned;

providing a maximum positive signed integer as the clamped integer result (i) when any of the shifted-out bits is a one and the operand is positive and signed, and (ii) when a most significant bit of the shifted intermediate result is a one and the operand is positive and signed;

providing a maximum negative signed integer as the clamped integer result (i) when any of the shifted-out bits is a zero and the operand is negative and signed, and (ii) when a most significant bit of the shifted intermediate result is a zero and the operand is negative and signed; and providing the shifted intermediate result as the clamped integer result (i) when all the shifted-out bits are zero's and the operand is unsigned, (ii) when all the shifted-out bits are zero's and the most significant bit of the shifted intermediate result is a zero and the operand is positive and signed, and (iii) when all the shifted-out bits are one's and the most significant bit of the shifted intermediate result is a one and the operand is negative and signed.

16. The method of claim 15, wherein N is in the range of 0 to M−1, the operand consists of M bits, the shifted intermediate result consists of M bits, and N least significant bits of the shifted intermediate result are padded with zero's.

17. The method of claim 16, wherein:

the maximum unsigned integer is an M-bit word that consists of one's;

the maximum positive signed integer is an M-bit word with a zero in a most significant bit position and one's in M−1 least significant bit positions; and the maximum negative signed integer is an M-bit word with a one in a most significant bit position and zero's in M−1 least significant bit positions.

18. The method of claim 16, wherein an overflow word includes M−1 overflow bits, the shifted-out bits are shifted into N least significant bit positions of the overflow bits, M−N−1 most significant bit positions of the overflow bits are padded with zero's when the operand is unsigned, and M−N−1 most significant bit positions of the overflow bits are padded with a most significant bit of the operand when the operand is signed.

19. The method of claim 15, wherein the previously recited steps are performed when N is within a maximum shift count, and including providing the maximum unsigned integer as the clamped integer result when N exceeds the maximum shift count and the operand is unsigned, providing the maximum positive signed integer as the clamped integer result when N exceeds the maximum shift count and the operand is positive, and providing the maximum negative signed integer as the clamped integer result when N exceeds the maximum shift count and the operand is negative.

20. The method of claim 15, wherein:

an overflow detector generates an overflow signal with a first logical value (i) when any of the shifted-out bits is a one and the operand is unsigned, (ii) when any of the shifted-out bits is a one and the operand is positive and signed, (iii) when the most significant bit of the shifted intermediate result is a one and the operand is positive and signed, (iv) when any of the shifted-out bits is a zero and the operand is negative and signed, and (v) when the most significant bit of the shifted intermediate result is a zero and the operand is negative and signed, and otherwise generates the overflow signal with a second logical value; and a clamping circuit provides the maximum unsigned integer as the clamped integer result when the overflow signal has the first logical value and the operand is unsigned, provides the maximum positive signed integer as the clamped integer result when the overflow signal has the first logical value and the operand is positive and signed, provides the maximum negative signed integer as the clamped integer result when the overflow signal has the first logical value and the operand is negative and signed, and provides the shifted intermediate result as the clamped integer result when the overflow signal has the second logical value.

21. The method of claim 15, wherein the clamped integer result is used to represent the operand multiplied by $2^N$.

22. The method of claim 15, performed in a single instruction cycle.

23. A processor for executing the method of claim 15.

24. A method of operating a circuit to left-shift an M-bit integer operand and provide an M-bit clamped integer result in a single instruction cycle, comprising:

providing a mode signal that indicates whether the operand is signed or unsigned;

left-shifting the operand by N bit positions to obtain an M-bit shifted intermediate result and N shifted-out bits, wherein N least significant bits of the shifted intermediate result are padded with zero's, when N is less than a maximum shift count;

providing an M-bit word that consists of one's as the clamped integer result (i) when any of the shifted-out bits is a one and the operand is unsigned, and (ii) when N exceeds the maximum shift count and the operand is unsigned;

providing an M-bit word with a zero in a most significant bit position and one's in M−1 least significant bit positions as the clamped integer result (i) when any of the shifted-out bits is a one and the operand is positive and signed, (ii) when a most significant bit of the shifted intermediate result is a one and the operand is positive and signed, and (iii) when N exceeds the maximum shift count and the operand is positive and signed;

providing an M-bit word with a one in a most significant bit position and zero's in M−1 least significant bit positions as the clamped integer result (i) when any of the shifted-out bits is a zero and the operand is negative and signed, (ii) when the most significant bit of the shifted intermediate result is a zero and the operand is negative and signed, and (iii) when N exceeds the maximum shift count and the operand is negative and signed; and providing the shifted intermediate result as the clamped integer result (i) when all the shifted-out bits are zero's and N is within the maximum shift count and the operand is unsigned, (ii) when all the shifted-out bits are zero's and the most significant bit of the shifted intermediate result is a zero and N is within the maximum shift count and the operand is positive and signed, and (iii) when all the shifted-out bits are one's and the most significant bit of the shifted intermediate result is a one and N is within the maximum shift count and the operand is negative and signed.

25. An apparatus for left-shifting an unsigned integer operand and providing a clamped integer result, comprising:

a left-shifter for left-shifting the operand by N bit positions, where N is an integer, to obtain a shifted intermediate result and N shifted-out bits;

an overflow detector for generating an overflow signal with a first logical value when any of the shifted-out bits is a one, and for generating the overflow signal with a second logical value when all the shifted-out bits are zero's; and a clamping circuit for providing a maximum unsigned integer as the clamped integer result when the overflow signal has the first logical value, and for providing the shifted intermediate result as the clamped integer result when the overflow signal has the second logical value.

26. The apparatus of claim 25, wherein N is in the range of 0 to M−1, the operand consists of M bits, the shifted intermediate result consists of M bits, N least significant bits of the shifted intermediate result are padded with zero's, and the maximum unsigned integer is an M-bit string of one's.

27. The apparatus of claim 26, wherein the left-shifter generates an overflow word that includes M−1 overflow bits, the shifted-out bits are shifted into N least significant bit positions of the overflow bits, and M−N−1 most significant bit positions of the overflow bits are padded with zero's.

28. The apparatus of claim 25, wherein the left-shifter left-shifts the operand by less than N bit positions and the overflow detector generates the overflow signal with the first logical value when N exceeds a maximum shift count regardless of the shifted-out bits.

29. The apparatus of claim 25, wherein:
the overflow detector provides the overflow signal as an OR of the overflow bits; and
the clamping circuit selects one of the maximum unsigned integer and the shifted intermediate result in response to the overflow signal.

30. The apparatus of claim 25, wherein the clamped integer result is used to represent the operand multiplied by $2^N$.

31. The apparatus of claim 25, wherein the operand is left-shifted and the clamped intermediate result is provided in a single instruction cycle.

32. An apparatus for left-shifting a signed integer operand and providing a clamped integer result, comprising:
a left-shifter for left-shifting the operand by N bit positions, where N is an integer, to obtain a shifted intermediate result and N shifted-out bits;
an overflow detector for generating an overflow signal with a first logical value (i) when any of the shifted-out bits is a one and the operand is positive, (ii) when a most significant bit of the shifted intermediate result is a one and the operand is positive, (iii) when any of the shifted-out bits is a zero and the operand is negative, and (iv) when the most significant bit of the shifted intermediate result is a zero and the operand is negative, and for generating the overflow signal with a second logical value (i) when all the shifted-out bits are zero's and the most significant bit of the shifted intermediate result is a zero and the operand is positive, and (ii) when all the shifted-out bits are one's and the most significant bit of the shifted intermediate result is a one and the operand is negative; and
a clamping circuit for providing a maximum positive signed integer as the clamped integer result when the overflow signal has the first logical value and the operand is positive, for providing a maximum negative signed integer as the clamped integer result when the overflow signal has the first logical value and the operand is negative, and for providing the shifted intermediate result as the clamped integer result when the overflow signal has the second logical value.

33. The apparatus of claim 32, wherein N is in the range of 0 to M−1, the operand consists of M bits, the shifted intermediate result consists of M bits, N least significant bits of the shifted intermediate result are padded with zero's, the maximum positive signed integer is an M-bit word with a zero in a most significant bit position and one's in M−1 least significant bit positions, and the maximum negative signed integer is an M-bit word with a one in a most significant bit position and zero's in M−1 least significant bit positions.

34. The apparatus of claim 33, wherein the left-shifter generates an overflow word that includes M−1 overflow bits, the shifted-out bits are shifted into N least significant bit positions of the overflow bits, and M−N−1 most significant bit positions of the overflow bits are padded with a most significant bit of the operand.

35. The apparatus of claim 32, wherein the left-shifter left-shifts the operand by less than N bit positions and the overflow detector generates the overflow signal with the first logical value when N exceeds a maximum shift count regardless of the shifted-out bits and the most significant bit of the shifted intermediate result.

36. The apparatus of claim 32, wherein:
the overflow detector provides a first signal as an OR of the overflow bits and the most significant bit of the shifted intermediate result, a second signal as an AND of the overflow bits and the most significant bit of the shifted intermediate result, and the overflow signal as an XOR of the first and second signals; and
the clamping circuit selects one of the maximum positive signed integer, the maximum negative signed integer, and the shifted intermediate result in response to the overflow signal and a most significant bit of the operand.

37. The apparatus of claim 32, wherein the clamped integer result is used to represent the operand multiplied by $2^N$.

38. The apparatus of claim 32, wherein the operand is left-shifted and the clamped integer result is provided in a single instruction cycle.

39. A apparatus for left-shifting an integer operand and providing a clamped integer result, comprising:
a left-shifter for left-shifting the operand by N bit positions, where N is an integer, to obtain a shifted intermediate result and N shifted-out bits;
an overflow detector for generating an overflow signal with a first logical value (i) when any of the shifted-out bits is a one and the operand is unsigned, (ii) when any of the shifted-out bits is a one and the operand is positive and signed, (iii) when a most significant bit of the shifted intermediate result is a one and the operand is positive and signed, (iv) when any of the shifted-out bits is a zero and the operand is negative and signed, and (v) when the most significant bit of the shifted intermediate result is a zero and the operand is negative and signed, and for generating the overflow signal with a second logical value (i) when all the shifted-out bits are zero's and the operand is unsigned, (ii) when all the shifted-out bits are zero's and the most significant bit of the shifted intermediate result is a zero and the operand is positive and signed, and (iii) when all the shifted-out bits are one's and the most significant bit of the shifter intermediate result is a one and the operand is negative and signed; and
a clamping circuit for providing a maximum unsigned integer as the clamped integer result when the overflow signal has the first logical value and the operand is unsigned, for providing a maximum positive signed integer as the clamped integer result when the overflow signal has the first logical value and the operand is positive and signed, for providing a maximum negative signed integer as the clamped integer result when the overflow signal has the first logical value and the operand is negative and signed, and for providing the shifted intermediate result as the clamped integer result when the overflow signal has the second logical value.

40. The apparatus of claim 39, wherein N is in the range of 0 to M−1, the operand consists of M bits, the shifted intermediate result consists of M bits, and N least significant bits of the shifted intermediate result are padded with zero's.

41. The apparatus of claim 40, wherein:
the maximum unsigned integer is an M-bit word that consists of one's;
the maximum positive signed integer is an M-bit word with a zero in a most significant bit position and one's in M−1 least significant bit positions; and the maximum negative signed integer is an M-bit word with a one in a most significant bit position and zero's in M−1 least significant bit positions.

42. The apparatus of claim 40, wherein the left-shifter generates an overflow word that includes M−1 overflow bits, the shifted-out bits are shifted into N least significant bit positions of the overflow bits, M−N−1 most significant bit positions of the overflow bits are padded with zero's when the operand is unsigned, and M−N−1 most significant bit positions of the overflow bits are padded with a most significant bit of the operand when the operand is signed.

43. The apparatus of claim 39, wherein the left-shifter left-shifts the operand by less than N bit positions and the overflow detector generates the overflow signal with the first logical value when N exceeds a maximum shift count regardless of the shifted-out bits and the most significant bit of the clamped integer result.

44. The apparatus of claim 39, wherein:

the overflow detector provides a first signal as an OR of the overflow bits and the most significant bit of the shifted intermediate result, a second signal as an AND of the overflow bits and the most significant bit of the shifted intermediate result, a third signal as an XOR of the first and second signals, a fourth signal as an AND of the third signal and a mode signal indicative of whether the operand is signed or unsigned, a fifth signal as an AND of the third signal and a bit-complement of the mode signal, and the overflow signal as an OR of the fourth signal and the fifth signal; and the clamping circuit selects one of the maximum unsigned integer, the maximum positive signed integer, the maximum negative signed integer, and the shifted intermediate result in response to the overflow signal, a most significant bit of the operand, and the mode signal.

45. The apparatus of claim 39, wherein the clamped integer result is used to represent the operand multiplied by $2_N$.

46. The apparatus of claim 39, wherein the operand is left-shifted and the clamped integer result is provided in a single instruction cycle.

47. A apparatus for left-shifting an M-bit integer operand and providing an M-bit clamped integer result, comprising:

a left-shifter for left-shifting the operand by N bit positions to obtain an M-bit shifted intermediate result and N shifted-out bits, wherein N least significant bit positions of the shifted intermediate result are padded with zero's, when N is within a maximum shift count of the left-shifter;

an overflow detector for generating an overflow signal with a first logical value (i) when any of the shifted-out bits is a one and the operand is unsigned, (ii) when any of the shifted-out bits is a one and the operand is positive and signed, (iii) when a most significant bit of the shifted intermediate result is a one and the operand is positive and signed, (iv) when any of the shifted-out bits is a zero and the operand is negative and signed, (v) when the most significant bit of the shifted intermediate result is a zero and the operand is negative and signed, and (vi) when N exceeds the maximum shift count, and for generating the overflow signal with a second logical value (i) when all the shifted-out bits are zero's and N is within the maximum shift count and the operand is unsigned, (ii) when all the shifted-out bits are zero's and the most significant bit of the shifted intermediate result is a zero and N is within the maximum shift count and the operand is positive and signed, and (iii) when all the shifted-out bits are one's and the most significant bit of the shifter intermediate result is a one and N is within the maximum shift count and the operand is negative and signed; and a clamping circuit for providing a maximum unsigned integer as the clamped integer result when the overflow signal has the first logical value and the operand is unsigned, for providing a maximum positive signed integer as the clamped integer result when the overflow signal has the first logical value and the operand is positive and signed, for providing a maximum negative signed integer as the clamped integer result when the overflow signal has the first logical value and the operand is negative and signed, and for providing the shifted intermediate result as the clamped integer result when the overflow signal has the second logical value.

48. An apparatus for left-shifting an integer operand and providing a clamped integer result in a single instruction cycle, comprising:

shifting means for left-shifting the operand to obtain a shifted intermediate result and shifted-out bits;

overflow detection means for generating an overflow signal; and clamping means for providing an integer value as the clamped integer result when the overflow signal indicates an overflow condition, and for providing the shifted intermediate result as the clamped integer result when the overflow signal indicates an absence of the overflow condition.

49. The apparatus of claim 48, wherein the clamping means provides a maximum positive signed integer as the clamped integer result when the operand is positive and signed, and provides a maximum negative signed integer as the clamped integer result when the operand is negative and signed.

50. The apparatus of claim 48, wherein the clamping means provides a maximum unsigned integer as the clamped integer result when the operand is unsigned.

* * * * *